Dec. 25, 1962 P. POULALLION ET AL 3,070,129
DEVICES FOR STOPPING PIPES CONTAINING FLUIDS UNDER PRESSURE
Filed May 11, 1962 3 Sheets-Sheet 1

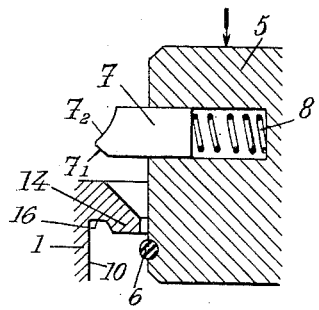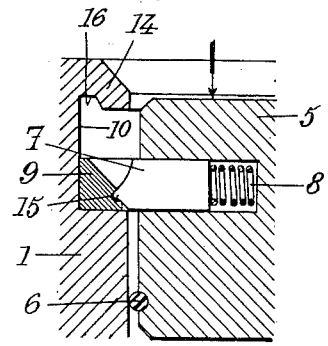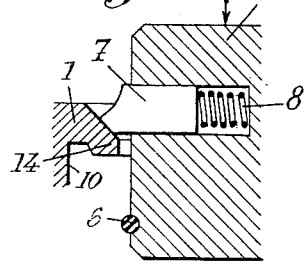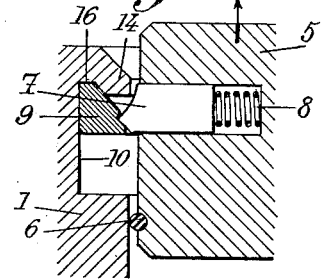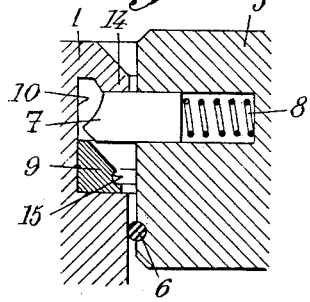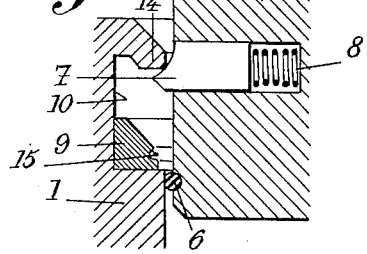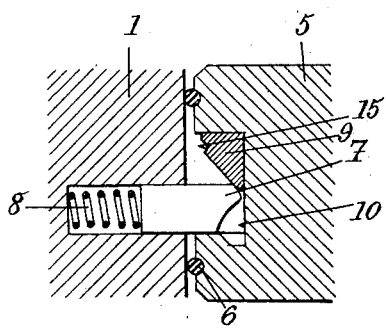

United States Patent Office 3,070,129
Patented Dec. 25, 1962

3,070,129
DEVICES FOR STOPPING PIPES CONTAINING FLUIDS UNDER PRESSURE
Paul Poulallion, Boulogne-sur-Seine, and Albert Storm, Argenteuil, France, assignors to Societe Petroliere de Gerance (SOPEG), Paris, France, a society of France
Filed May 11, 1962, Ser. No. 194,056
Claims priority, application France May 16, 1961
8 Claims. (Cl. 138—89)

The present invention relates to devices for stopping pipes containing fluids under pressure (petroleum, natural gas or any other fluid). The invention is more especially concerned with devices of this kind comprising plugs to be introduced into the pipes to be stopped, in particular through valves in open position.

The chief object of our invention is to provide a device of this kind which is better adapted to meet the requirements of practice than those known up to this time, in particular concerning the locking of the plugs in working position and their release from said position.

The invention consists chiefly in providing one of the two elements that are to cooperate together (said elements being a plug and a pipe, respectively) with cams movable radially under the action of resilient means and either capable of projectin g from said elements (projecting position) or of being driven into this element (retracted position) according as said resilient means are either expanded or compressed, respectively, and in providing the other element with an annular groove, having an axial dimension greater than that of the cams, capable of receiving said cams in their projecting positions, which ensures a locking of the plug in the pipe by axial abutment of the cams against the external edge of said groove, a rigid ring, having an axial dimension smaller than that of the groove, being housed in a slidable fashion in said groove, the cams and the ring being shaped in such manner that the cooperation of the cams with the ring, when the plug is driven axially into the pipe beyond its locked position compresses the resilient means and causes the cams to be partly retracted by the ring, the axial pulling off of the plug, after this operation, causing the ring to be pulled outwardly until it is stopped by the external edge of the groove, after which the cams slide against said edge to be forced into retracted position, thus releasing the plug.

Other features of the invention will become apparent in the course of the following detailed description of preferred embodiments thereof with reference to the appended drawings, given merely by way of example, and in which.

Figure 2:
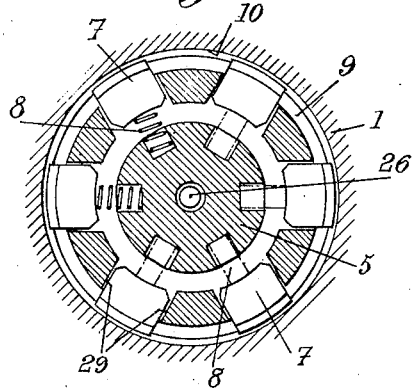
FIG. 2 is a cross section on the line II—II of FIG. 1.
Figure 10:
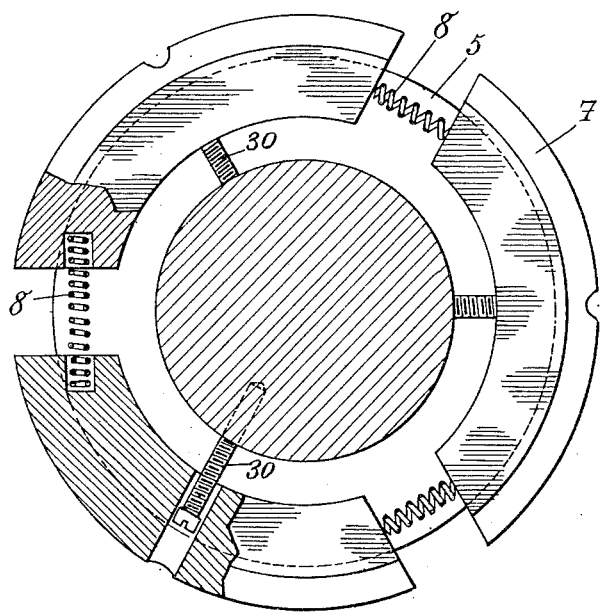

FIGS. 3 to 8 inclusively are partial axial sections showing the relative position of the parts at different times during the engagement of the plug in the pipe and its removal therefrom;

FIG. 9 is a part axial section showing a modification;

FIG. 10 is a cross sectional view similar to FIG. 2 and relating to a modification.

It should first be reminded that in installations for conveying oil or gas under pressure through pipelines it is often necessary to connect branch pipes on a main pipe, and this without lowering the pressure of the fluid that is conveyed. It is for instance the case when it is desired to make repairs in a portion of a pipeline without stopping the flow of liquid through the pipeline.

It is known, for this purpose, to weld about the main pipe the two branches of a hollow T disposed in line with each other and then to connect with the stem of the T a valve and a drilling machine, to cut with this machine, closed in a fluidtight manner, through said valve in open position and said stem, a portion of the main pipe and finally to connect the branch pipe with the valve.

The same method may be used to introduce a plug into the main pipe opposite one of the branches of the T.

When the branch pipe is no longer useful it may be sufficient to close the valve and to remove the branch pipe. In a likewise manner when the main pipe is no longer to be stopped it may be sufficient to remove the plug and then to close the valve.

These methods have the drawback of maintaining the valve in position, which is very expensive.

In order to avoid this, it has been proposed to introduce, by means of a rod, through a lock-chamber, said valve in open position, and the stem of the T, successively, a plug capable of temporarily closing said stem in a fluidtight manner against the pressure existing in the main pipe.

In order to lock this plug in the stem of the T, use is made of fingers mounted in said stem and movable radially by screwing, said fingers cooperating with an annular groove provided in the plug. The fluidtightness temporarily ensured by an annular sealing member interposed betwen the plug and the stem of the T, was sufficient to give time, without risk of exaggerate leaks, of disengaging the valve and replacing it by a solid closure plate tightly secured by screwing on said stem to ensure perfect fluidtightness.

This method makes it possible to recover the valve but experience has taught that it is difficult to position a plug from a distance (by means of the rod) in such manner that the groove is located exactly opposite the fingers. Furthermore the existence of radial guides for the fingers requires the use of special packing means, which are delicate and expensive. The screws are frequently attacked by the liquids and the operations of screwing and unscrewing the fingers, controlled from the outside, take a lot of time.

In order to obviate these drawbacks, according to our invention, use is made of an annular row of cams guided in housings provided in the plug (or in the pipe) these cams being urged radially by resilient means and adapted to lock the plug in the pipe by cooperating axially with the external edge of a wide groove formed in the pipe (or in the plug) a rigid ring freely slidable in said groove being adapted to cooperate with the cams when the plug is driven beyond the position of locking thereof, so as partly to retract said cams in said housings and to keep them in this partly retracted position when the plug is pulled out, after which full retraction of the cams is obtained by their sliding along the external edge of the groove, thus permitting to pull the plug outwardly beyond the position thereof for which the cams had initially locked the plug.

In the preferred embodiments of our invention the cams are carried by the plug and the annular groove is formed in a wall of the pipe.

The drawings show the stem 1 of the T forming the pipe element to be stopped, the arms 2 and 3 of this T, the main pipe 4 on which the T is mounted, the plug 5 provided with a toroidal-shaped sealing ring 6 to ensure fluidtightness between said plug and pipe 1, cams 7, the resilient means 8 urging these cams radially and the rigid ring 9 freely slidable in the groove 10.

The locking and release operations may be understood more easily by referring to FIGS. 3 to 8 which relate to the preferred embodiment of the invention (cams mounted on the plug).

In the position shown by FIG. 3, the plug, which is supposed to be driven in the downward direction by means for instance of a rod screwed in a threaded bore 11 (FIG.

1), is just entering pipe 1. Cams 7 are in their projecting positions. These positions are determined (in other words the outward displacements of cams 7 are limited) through suitable means such as heels 12 (FIG. 1) carried by said cams and cooperating with shoulders 13, provided in the plug.

When the plug is driven into pipe 1 the surfaces $7_1$ of the cams come into contact with the upper surface of the outer edge 14 of groove 10 and, due to the fact that these surfaces $7_1$, and the cooperating surface of edge 14 are of frusto-conical shape, the cams slide along said surface of edge 14, as shown by FIG. 4 and are accordingly pushed inwardly toward their retracted positions.

When the cams have reached their retracted positions the ends of these cams slide along the cylindrical portion of edge 14 and as soon as they have moved past this position they are pushed outwardly by springs 8 so as to come into the position of FIG. 5. In this position plug 5 is locked in pipe 1 and cannot be expelled therefrom by the pressure of the liquid present in said pipeline.

In order to release the plug so as to be able to withdraw it from pipe 1, said plug is first driven to a greater distance into pipe 1. Due to this movement the cams come into contact with the frusto-conical inner surface of ring 9, against which they slide, undergoing inward radial displacements, until the peripheral edges of the cams come to fit into an annular groove 15 of ring 9, as shown by FIG. 6.

Ring 9 is now caught by cams 7 and when plug 5 is pulled back in the outward direction, i.e. upwardly, from pipe 1 ring 9 also moves together with said plug and comes into the position of FIG. 7 where said ring 9 is stopped by being engaged in a groove 16 provided in the under face of the edge 14 of pipe 1. If plug 5 is further pulled upwardly the pointed edges of cam 7 leave the groove 15 of ring 9 and the upper surfaces $7_2$ (see FIG. 3) of the cams slide along edge 14 thus causing said cams to come into their retracted positions, whereby plug 5 is released from pipe 1.

Figure 1:
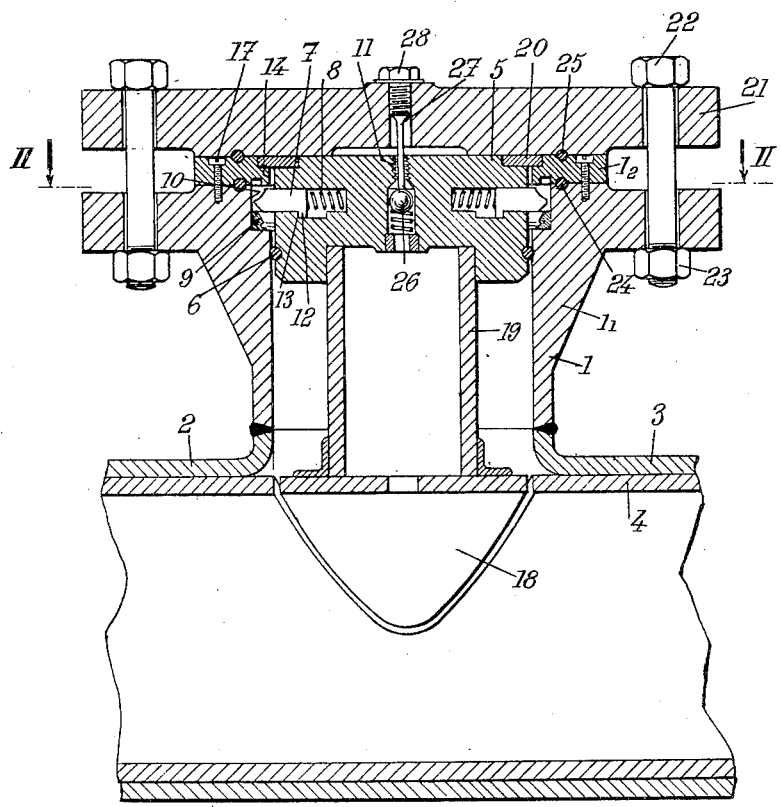
FIG. 1 is an axial sectional view of a stopping device made according to our invention.

Referring to FIG. 1, the following features are to be observed:

Pipe 1 (forming the stem of the T), is made of two portions $1_1$ and $1_2$ assembled together by means of screws 17, the outer portion $1_2$ forming the external edge 14 of groove 10, so that ring 9 can be easily removed from said groove when necessary;

Plug 5 is assembled through a tubular element 19 with a portion 18 cut off from the main pipe 4 so that this portion 18 is positioned in line with the wall of said pipe 4, which prevents any wedging of scraping tools to be passed through said pipe 4;

Shims 20 secured on plug 5, for instance by screwing, limit the axial downward movement of the plug by co-operating with corresponding surfaces of portion $1_2$ of the pipe;

A solid cover plate 21 is fixed against the top end of pipe 1 through bolts and nuts 22—23;

Fluidtightness between part $1_1$ and $1_2$, on the one hand, and between part $1_2$ and cover plate 21, on the other hand, is obtained by means of toroidal sealing joints 24 and 25;

A ball valve 26 is mounted axially in plug 5 so as to be pushed into closing position by the pressure of the liquid in pipe 1, for instance when cover plate 21 has not yet been fixed in position. On the contrary said valve 26 may be opened by means of a rod 27 adapted to be controlled from the outside by means of a screw 28, so as to place into communication with each other the two faces of plug 5 after cover plate 21 has been fitted in position, whereby said cover plate supports an important portion of the pressure in pipe 1, thus reducing the stress on plug 5.

In the embodiment illustrated by FIGS. 1 and 2, the cams, the number of which is six, extend in six radial directions making each an angle of 60° with the next one and the resilient means 8 are helical springs pushing the cams outwardly.

For pipes of small diameters, for instance at most equal to 15 cm., it may be advantageous to make use of the arrangement illustrated by FIG. 10. In this case the cams, the number of which is smaller, for instance three in the example shown, are connected together through spring 8 interposed circumferentially between the side faces of these cams.

Cams 7 may be guided radially in any suitable manner, for instance by means of slideways 29 in the embodiment of FIG. 2 or of bolts 30 in the embodiment of FIG. 10.

As shown by FIG. 3 the peripheral surfaces of the cams advantageously comprise two portions $7_1$ and $7_2$ making with each other an angle of about 90°. These portions $7_1$ and $7_2$ make, near the edge of the cam where they join each other, respective angles of about 45° with the vertical. The under surface $7_1$ has a substantially rectilinear vertical section so as to be able to cooperate with the upper surfaces of edge 14 and of ring 9. The vertical section of portion $7_2$ of every cam is curvilinear, the tangent to the upper end of said portion making a very small angle with the vertical. These surfaces $7_2$ cooperate with the edge 14 during the last step of the extraction of the plug to bring the cams into their retracted positions.

The diameters of the plugs may be of any value but they preferably range from 5 cms. to one meter. The internal pressures are generally of some tens of $kg./cm.^2$ but they may be as high as some hundreds of $kg./cm.^2$.

The device according to our invention has many advantages. In particular, locking and release of the plug are obtained automatically by merely moving the plug with respect to the pipe. Furthermore no radial hole has to be made in the pipe and all the elements of the device may be made of strong construction and are not liable to be attacked by the fluid circulating through the pipes.

In the modification of FIG. 9 the cams 7 are mounted slidable radially in pipe 1 and the groove 10 is formed in the plug. The operation is quite analogous to that above described with refererence to the construction of FIGS. 1 and 2.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. A device of the type described which comprises, in combination, two cooperating elements, said elements being a cylindrical pipe and a cylindrical plug dimensioned to fit in said pipe and intended to stop it when engaged thereinto through one end of said pipe, called the outer end thereof, the other end of said pipe, called its inner end, containing a fluid under pressure, the end of said plug that is engaged into said pipe being called the inner end of said plug and the other end of said plug being called its outer end, one of said elements, called the first element, being provided, in the cylindrical wall thereof facing the cylindrical wall of the other element, called the second element, with an annular groove, the edge of said groove that is nearer the outer end of said first element being called the outer edge of said groove, a plurality of cams movably carried by said second element and each slidable radially with respect thereto between two positions, a projecting position wherein said cam, when located opposite said groove, projects thereinto, and a retracted position wherein said cam does not project beyond the outer edge of said groove, resilient means operatively connected with said cams for urging them toward their projecting positions, the dimension of said groove in the axial direction of said elements being greater than the dimension of said cams in the same direction, sealing means between the inner end portion of said plug and the inner end portion of said pipe, a rigid ring fitting slidably in said groove and the thickness of which is at most equal to the difference between the above mentioned dimensions of said groove and said cams, respectively, said cams having surfaces adapted to cooperate both with the outer edge of said groove and with said ring so as to be retracted when the plug is driven into said pipe toward the inner end thereof until they snap back into their projecting positions under the action of said resilient means, said ring having surfaces adapted to cooperate with said cam surfaces to push said cams into partly retracted positions when the plug is further moved in said pipe toward the inner end thereof, said ring and said cams having cooperating portions for yieldingly assembling said ring with said cams when the latter are in said partly retracted positions, and said cams being provided with surfaces adapted to cooperate with said groove outer edge when the plug is pulled away from the inner end of said pipe after cams have been brought into partly retracted position by said ring and the ring has been pulled outwardly in said groove, together with said plug.

2. A device according to claim 1 wherein the first element is the pipe and the second element is the plug.

3. A device according to claim 1 wherein the first element is the plug and the second element is the pipe.

4. A device according to claim 1 wherein the peripheral portion of each of said cams, adapted to engage into said groove, has a section by a plane passing through the axis of said plug which comprises two lines forming, at the point where they join each other, an angle approximating 90°, and each make, in the proximity of this point an angle approximating 45° with the direction of said axis.

5. A device according to claim 4 wherein that of said lines which extends toward the outer end of said second element is curvilinear and concave toward the other element.

6. A device according to claim 4 wherein said ring has a frusto conical surface and an annular groove formed at one end of said surface.

7. A device according to claim 1 wherein said resilient means are radially extending springs interposed between each of said cams respectively and the second element.

8. A device according to claim 1 wherein said resilient means are circumferentially extending springs interposed between two adjacent cams.

References Cited in the file of this patent

UNITED STATES PATENTS

| | | |
|---|---|---|
| 508,066 | Tilger et al. | Nov. 7, 1893 |
| 2,010,200 | Rufener et al. | Aug. 6, 1935 |

FOREIGN PATENTS

| | | |
|---|---|---|
| 13,644 | Great Britain | July 3, 1905 |